US012313858B2

(12) United States Patent
Brown

(10) Patent No.: US 12,313,858 B2
(45) Date of Patent: May 27, 2025

(54) CAMERA ASSEMBLY PROVIDING OPTICAL IMAGE STABILISATION

(71) Applicant: CAMBRIDGE MECHATRONICS LIMITED, Cambridge (GB)

(72) Inventor: Andrew Benjamin David Brown, Cambridge (GB)

(73) Assignee: CAMBRIDGE MECHATRONICS LIMITED, Cambridge (GB)

(*) Notice: Subject to any disclaimer, the term of this patent is extended or adjusted under 35 U.S.C. 154(b) by 571 days.

(21) Appl. No.: 17/504,790

(22) Filed: Oct. 19, 2021

(65) Prior Publication Data
US 2022/0035176 A1 Feb. 3, 2022

Related U.S. Application Data

(63) Continuation of application No. 15/770,386, filed as application No. PCT/GB2016/053356 on Oct. 28, 2016, now Pat. No. 11,187,916.

(30) Foreign Application Priority Data

Oct. 28, 2015 (GB) ........................... 1519034
Oct. 28, 2015 (GB) ........................... 1519036

(51) Int. Cl.
*G02B 27/64* (2006.01)
*F03G 7/06* (2006.01)
(Continued)

(52) U.S. Cl.
CPC ......... *G02B 27/646* (2013.01); *F03G 7/0614* (2021.08); *F03G 7/065* (2013.01); *H04N 23/54* (2023.01); *H04N 23/687* (2023.01)

(58) Field of Classification Search
CPC ..... G02B 27/646; G02B 27/64; F03G 7/0614; F03G 7/06143; F03G 7/065; F03G 7/06; H04N 23/687; H04N 23/54; H04N 23/68
(Continued)

(56) References Cited

U.S. PATENT DOCUMENTS 5,684,640 A   11/1997 Tanaka et al.
6,064,827 A    5/2000 Toyoda
(Continued)

FOREIGN PATENT DOCUMENTS

CN     1881066     12/2006
CN    101668947     3/2010
(Continued)

OTHER PUBLICATIONS

Hiroki Cho et al: "Exploitation of shape memory alloy actuator using resistance feedback control and its development", Progress in Natural Science, vol. 20, Nov. 1, 2010 (Nov. 1, 2010), pp. 97-103, XP055334987, CN ISSN: 1002-0071 (12) 60013-6 pp. 101-102, paragraph 3.4; figures 14, 15.
(Continued)

*Primary Examiner* — Thomas K Pham
*Assistant Examiner* — Kuei-Jen L Edenfield
(74) *Attorney, Agent, or Firm* — Van Hoven PC; Stefan D. Osterbur; Joshua Van Hoven

(57) ABSTRACT

A camera assembly comprises a support structure and an image sensor mounted on a carrier that is suspended on the support structure by at least one plain bearing that allows movement of the carrier and the image sensor relative to the support structure in any direction laterally to the light-sensitive region of the image sensor. An actuator arrangement comprising plural shape memory alloy wires is arranged to move the carrier and the image sensor relative to
(Continued)

the support structure for providing optical image stabilisation of the image captured by the image sensor.

10 Claims, 4 Drawing Sheets

(51) Int. Cl.
*H04N 23/54* (2023.01)
*H04N 23/68* (2023.01)

(58) Field of Classification Search
USPC .................................. 359/694–706, 811–830
See application file for complete search history.

(56) References Cited

U.S. PATENT DOCUMENTS

| | | | |
|---|---|---|---|
| 8,248,497 | B2 | 8/2012 | Tanimura et al. |
| 11,187,916 | B2 * | 11/2021 | Brown .................. G02B 27/646 |
| 2001/0022688 | A1 | 9/2001 | Kosaka et al. |
| 2004/0227739 | A1 | 11/2004 | Tani et al. |
| 2006/0061660 | A1 | 3/2006 | Brackmann |
| 2006/0133786 | A1 | 6/2006 | Teramoto |
| 2006/0150627 | A1 | 7/2006 | Oohara |
| 2006/0284495 | A1 * | 12/2006 | Seo ...................... H02K 11/215 |
| | | | 348/208.4 |
| 2007/0109412 | A1 | 5/2007 | Hara |
| 2008/0074744 | A1 | 3/2008 | Osaka et al. |
| 2008/0198249 | A1 | 8/2008 | Tanimura et al. |
| 2008/0231955 | A1 | 9/2008 | Otsuka |
| 2010/0265343 | A1 | 10/2010 | Lee et al. |
| 2011/0013283 | A1 | 1/2011 | Sato |
| 2011/0292509 | A1 | 12/2011 | Yasuda |
| 2013/0155262 | A1 | 6/2013 | Katoh et al. |
| 2013/0222685 | A1 * | 8/2013 | Topliss ................. G02B 27/646 |
| | | | 348/373 |
| 2016/0154251 | A1 | 6/2016 | Ladwig et al. |

FOREIGN PATENT DOCUMENTS

| | | |
|---|---|---|
| CN | 102150073 | 8/2011 |
| CN | 202077117 | 12/2011 |
| CN | 102414611 | 4/2012 |
| CN | 104335101 | 2/2015 |
| DE | 102004002890 | 8/2005 |
| EP | 1659435 | 5/2006 |
| JP | 2007064063 | 3/2007 |
| WO | WO 2007113478 | 10/2007 |
| WO | WO 2010029316 | 3/2010 |
| WO | WO 2010089529 | 8/2010 |
| WO | WO 2011104518 | 9/2011 |
| WO | WO 2012020212 | 2/2012 |
| WO | WO 2012038703 | 3/2012 |
| WO | WO 2012066285 | 5/2012 |
| WO | WO 2013118601 | 8/2013 |
| WO | WO 2013175197 | 11/2013 |
| WO | WO 2014076463 | 5/2014 |
| WO | WO 2014083318 | 6/2014 |

OTHER PUBLICATIONS

Cho, H., et al., "Exploitation of shape memory alloy actuator using resistance feedback control and its development", Progress in Natural Science: Materials International, vol. 20, 2010, pp. 97-103.

* cited by examiner

CAMERA ASSEMBLY PROVIDING OPTICAL IMAGE STABILISATION

CROSS-REFERENCE TO RELATED APPLICATIONS

This application is a continuation of U.S. patent application Ser. No. 15/770,386, filed Apr. 23, 2018, which is a national stage application under 35 U.S.C. § 371 of International Application PCT/GB2016/053356, filed Oct. 28, 2016, which claims priority of GB Patent Applications GB 1519036.6, filed Oct. 28, 2015, and GB 1519034.1, filed Oct. 28, 2015. The disclosures of which are hereby incorporated by reference herein in their entireties.

The present invention relates to camera assemblies in which optical image stabilisation (OIS) is provided.

In a camera, the purpose of OIS is to compensate for camera shake, that is vibration of the camera, typically caused by user hand movement, that degrades the quality of the image captured by the image sensor. Mechanical OIS typically involves detecting the vibration by a vibration sensor such as a gyroscope sensor, and controlling, on the basis of the detected vibration, an actuator arrangement that adjusts the camera apparatus to compensate for the vibration. Several techniques for adjusting the camera apparatus are known. OIS by processing of a captured image is possible in principle but requires significant processing power. Accordingly, there has been developed mechanical OIS in which the optical system of the camera is adjusted mechanically.

A number of actuator arrangements employing mechanical OIS techniques are known and applied successfully in relatively large camera apparatuses, such as digital still cameras, but are difficult to miniaturise. Cameras have become very common in a wide range of portable electronic equipment, for example mobile telephones and tablet computers, and in many such applications miniaturisation of the camera is important. The very tight packaging of components in miniature camera apparatuses presents great difficulties in adding OIS actuators within the desired package.

In one type of mechanical OIS, the camera unit comprising an image sensor and a lens system for focusing an image on the image sensor is tilted relative to the support structure of the camera assembly around two notional axes that are perpendicular to each other and to the light-sensitive region of the image sensor. Such a type of OIS will be referred to herein as "OIS-tilt". WO-2010/029316 and WO-2010/089529 each disclose camera assemblies of this type in which a plurality of shape memory alloy (SMA) actuator wires are arranged to drive tilting of the camera unit. In such a camera, sufficient clearance needs to be provided to allow for tilting of the entire camera unit.

In another type of mechanical OIS, a lens assembly is moved orthogonal to the optical axis of the at least one lens. Such a type of OIS will be referred to herein as "OIS-lens shift". OIS-lens shift has the potential to reduce the size of the overall package for the camera as compared to OIS-tilt because only the lens assembly is moved and the lateral movement thereof requires less clearance than tilting the entire camera. WO-2013/175197 and WO-2014/083318 each disclose camera assemblies of this type in which a plurality of SMA actuator wires are arranged to drive movement of the lens arrangement. WO-2013/175197 and WO-2014/083318 use different suspension systems for the lens assembly, utilising beams and ball bearings, respectively.

The first aspect of the present invention is concerned with an alternative camera assembly that can provide OIS using SMA actuator wires.

According to a first aspect of the present invention, there is provided a camera assembly comprising: a support structure; an image sensor having a light-sensitive region, the image sensor being suspended on the support structure in a manner allowing movement of the image sensor relative to the support structure in any direction laterally to the light-sensitive region of the image sensor; and plural shape memory alloy actuator wires in an arrangement capable, on selective driving thereof, of moving the image sensor relative to the support structure in any direction laterally to the light-sensitive region of the image sensor.

The first aspect of the present invention therefore provides relative movement between the image sensor and a lens assembly provided in a camera in which the camera assembly may be incorporated. That relative movement provides OIS in a similar manner to OIS-lens shift. As the movement is driven by plural SMA actuator wires, this achieves similar advantages to those described in WO-2013/175197 and WO-2014/083318. For example, the use of SMA actuator wires facilitates miniaturisation compared to other types of actuator, and the dimension along the optical axis may be reduced compared to OIS-tilt arrangements.

However, the first aspect of the present invention differs from OIS-lens shift in that the image sensor, rather than the lens assembly, is moved laterally. This provides a number of advantages as follows.

Movement of the image sensor is typically more convenient, as the image sensor is a smaller component than the lens assembly. This facilitates miniaturisation of the camera.

Also, provision of OIS by movement of the image sensor can improve the performance of the OIS compared to OIS-lens shift. While the major component of shake-induced image blur is in the plane perpendicular to the optical axis, rotational blur can also be caused by rotation around the optical axis. A counter-rotation of the lens assembly has no effect on this rotation induced blur, as the lens assembly is typically rotationally symmetric around the optical axis. However, the first aspect of the present invention allows rotational image stabilisation also to be provided. That is, the image sensor may be supported on the support structure in a manner further allowing rotation of the image sensor about an axis orthogonal to the light-sensitive region, and the plural shape memory alloy actuator wires may be provided in an arrangement capable, on selective driving, of rotating the image sensor about that axis.

The second aspect of the present invention is concerned with an alternative camera assembly that can provide OIS.

According to a second aspect of the present invention, there is provided a camera assembly comprising: a support structure; an image sensor mounted on a carrier, the image sensor having a light-sensitive region; at least one plain bearing comprising a bearing surface on each of the carrier and the support structure, which bearing surfaces bear on each other so as to suspend the carrier on the support structure and allow movement of the image sensor relative to the support structure in any direction laterally to the light-sensitive region of the image sensor; an actuator arrangement arranged to move the image sensor relative to the support structure in any direction laterally to the light-sensitive region of the image sensor.

The second aspect of the present invention therefore provides relative movement between the image sensor and a lens assembly provided in a camera in which the camera assembly may be incorporated. That relative movement provides OIS in a similar manner to OIS-lens shift. However, the second aspect of the present invention differs from OIS-lens shift in that the image sensor, rather than the lens assembly, is moved laterally to the light-sensitive region of the image sensor. This provides a number of advantages as follows.

Movement of the image sensor is typically more convenient, as the image sensor is a smaller component than the lens assembly. This facilitates miniaturisation of the camera.

Also, provision of OIS by movement of the image sensor can improve the performance of the OIS compared to OIS-lens shift. While the major component of shake-induced image blur is in the plane perpendicular to the optical axis, blur can also be caused by rotation around the optical axis. A counter-rotation of the lens assembly has no effect on this rotation induced blur, as the lens or lenses of the lens assembly are typically rotationally symmetric around the optical axis. However, the second aspect of the present invention allows rotational image stabilisation also to be provided. That is, the image sensor may be supported on the support structure in a manner further allowing rotation of the image sensor about an axis orthogonal to the light-sensitive region, and the plural shape memory alloy actuator wires may be provided in an arrangement capable, on selective driving, of rotating the image sensor about that axis.

For suspending the carrier on the support structure and allowing movement of the image sensor relative to the support structure in any direction laterally to the light-sensitive region of the image sensor, the second aspect of the present invention uses at least one plain bearing comprising a bearing surface on each of the carrier and the support structure, which bearing surfaces bear on each other. A plain bearing is a bearing comprising two bearing surfaces which bear on each other, permitting relative sliding motion. Of course, a plain bearing is a simple type of bearing which is known for use in other applications. Inevitably, the friction within the bearing adversely affects the performance, particularly in a miniature arrangement.

However, surprisingly, a plain bearing can in fact be used to provide good performance in which the friction is sufficiently low to allow lateral movement. Particular advantage is achieved in the case that the actuator arrangement comprises plural SMA actuator wires, as SMA provides a high actuation force compared to other forms of actuator, which assists in overcoming the friction in a plain bearing.

Furthermore, this type of suspension of at least one plain bearing in the second aspect of the present invention provides particular advantages, as follows.

Firstly, a plain bearings may be formed with inherently small size along the height of the bearing, that is along the optical axis, especially compared to a suspension system employing balls. This allows the size of the suspension to be reduced along the optical axis compared to the use of ball bearings, for example as disclosed in WO-2014/083318.

Secondly, the image sensor generates a large amount of heat. Thus, it is desirable that the image sensor is attached to other components that act as a heat sink to allow that heat to be dissipated. This reduces the temperature rise of the image sensor and the thermal degradation that results from the image sensor self-heating.

One approach for dissipating generated heat would be to attach a heat sink to the image sensor and moving both the image sensor and the heat sink. However this is not desirable, particular in a miniature camera, because it requires both the heat sink and the image sensor to be moved, thus increasing the size and/or the power consumption of the camera assembly.

The at least one plain bearing not only suspends the image sensor and allows its movement, but also facilitates heat transfer from the image sensor to the support structure. This is because the bearing surface on each of the carrier and the support structure bear on each other and thus provide a continuous region of thermally conductive material without an air gap. This provides a path having good thermal conductivity for dissipating heat from the image sensor, as well as providing the requisite suspension.

The bearing surfaces may each be planar. This improves the thermal conductivity of the planar bearing by providing a relatively large area of contact.

A fluid may be disposed between the bearing surfaces, for example a grease. This may improve the thermal conductivity of the planar bearing, especially if the fluid is chosen to have a high thermal conductivity.

The two aspects of the present invention may be used in combination. In that case, the preferred features of the two aspects may be applied together in any combination.

Both aspects of the present invention provide particular advantage when applied to a camera assembly for miniature camera, for example where the light-sensitive region of the image sensor has a diagonal length of at most 12 mm.

To allow better understanding, an embodiment of the present invention will now be described by way of non-limitative example with reference to the accompanying drawings, in which.

Figure 1:
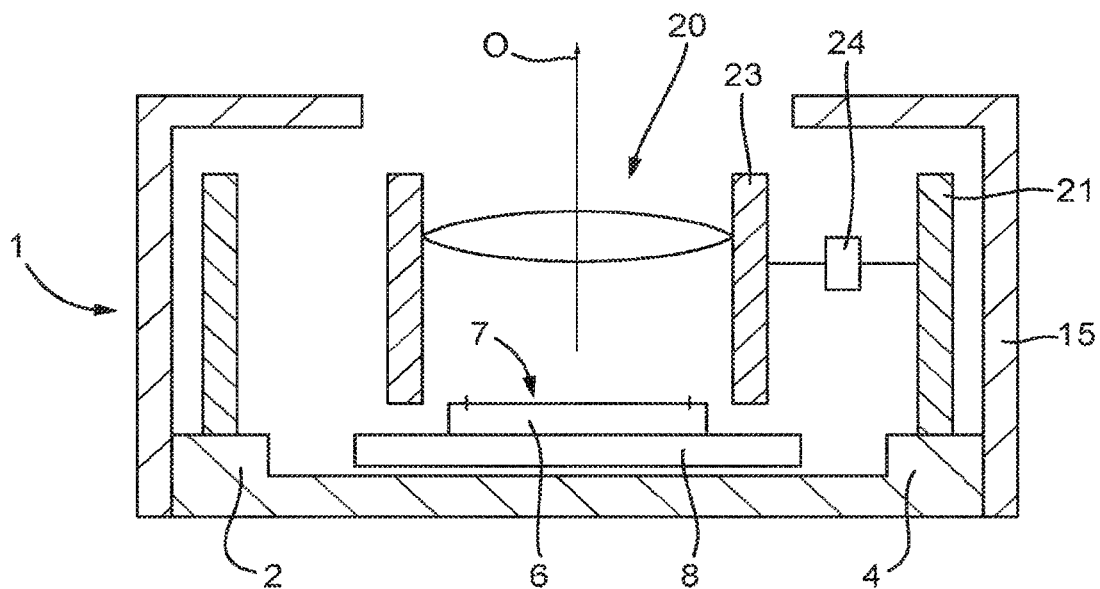
FIG. 1 is a schematic cross-sectional view of a camera apparatus including a camera assembly.

A camera apparatus 1 that incorporates an OIS-sensor shift camera assembly 2 in accordance with the present invention is shown in FIG. 1, which is a cross-sectional view taken along the optical axis O. The camera apparatus 1 is to be incorporated in a portable electronic device such as a mobile telephone, or tablet computer. Thus, miniaturisation is an important design criterion.

Figure 2:
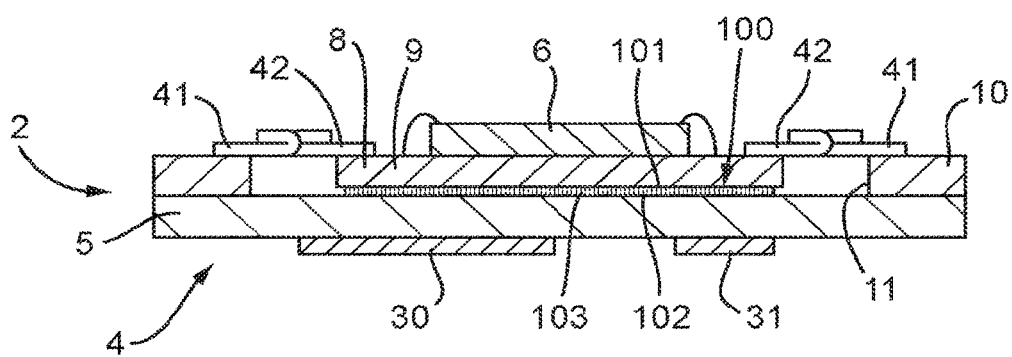
FIG. 2 is a cross-sectional view of the camera assembly.
Figure 3:
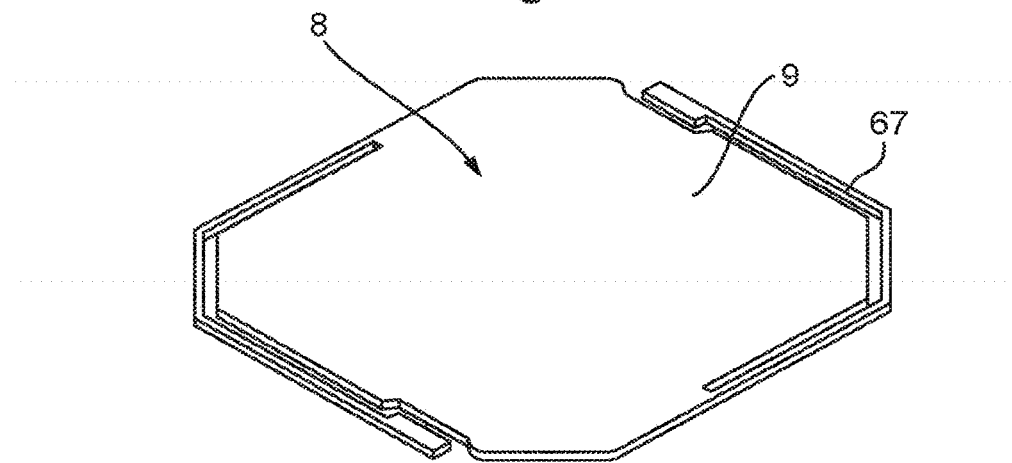
FIG. 3 is a perspective view of a moving plate of a carrier of the camera assembly.
Figure 4:
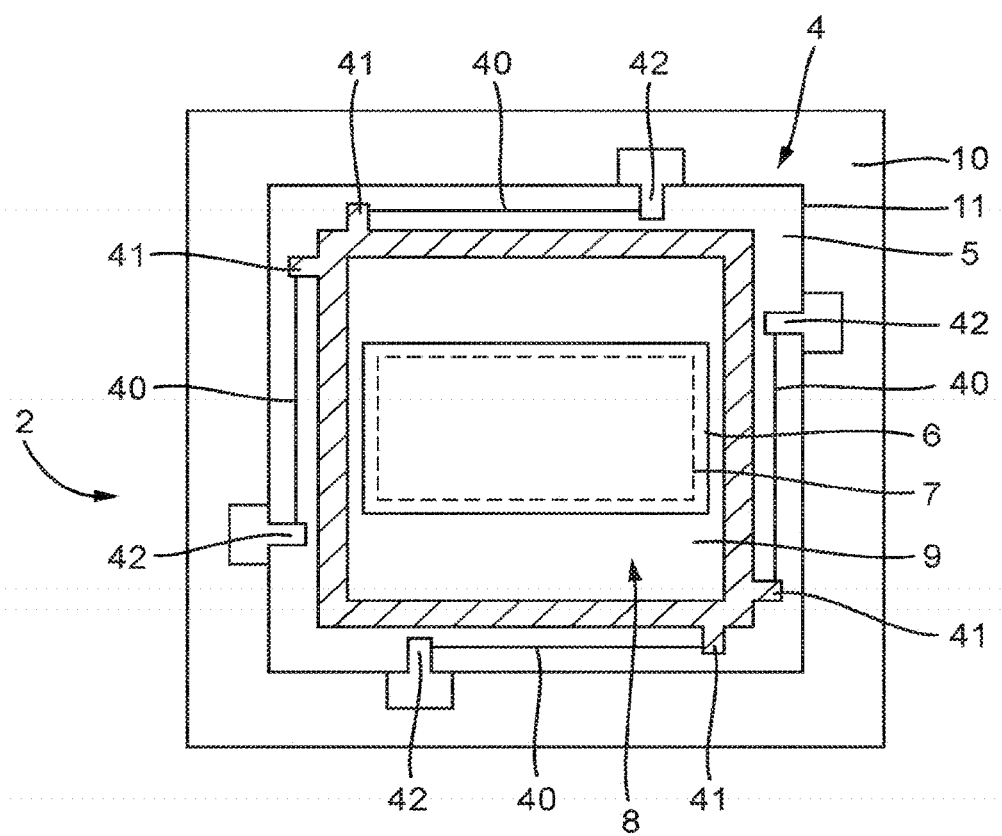
FIG. 4 is a plan view of the camera assembly from above.

The camera assembly 2 is shown in detail in FIGS. 2 to 4, FIG. 2 being a side view of the camera assembly 2, FIG. 3 being a perspective view of a moving plate 9 of a carrier 8 of the camera assembly 2; and FIG. 4 being a plan view of the camera assembly 2. For clarity, FIGS. 2 and 4 omit the flexures 67 described below. The camera assembly 2 may be manufactured first and then assembled with the other components of the camera apparatus 1.

The camera assembly 2 comprises a support structure 4 on which is supported an image sensor 6 having a light-sensitive region 7. The optical axis O is orthogonal to the light-sensitive region 7. The image sensor 6 captures an image and may be of any suitable type, for example a CCD (charge-coupled device) or a CMOS (complimentary metal-oxide-semiconductor) device. As is conventional, the image sensor 6 has a rectangular light-sensitive region 7. Without limitation to the invention, in this example the camera apparatus 1 is a miniature camera in which the light-sensitive region 7 of the image sensor 6 has a diagonal length of at most 12 mm.

The image sensor 6 is mounted on a carrier 8 which comprises a moving plate 9. The moving plate 9 may formed from sheet material, which may be a metal for example steel such as stainless steel. The moving plate 9 is shown in isolation in FIG. 3 and includes flexures 67 that are described in more detail below.

Although the carrier 8 comprises a single moving plate 9 in this example, optionally the carrier 8 may comprise other layers which may be attached to or laminated with the moving plate 9.

The support structure 4 comprises a support plate 5 which may formed from sheet material, which may be a metal for example steel such as stainless steel.

Although the support structure 4 comprises a single support plate 5 in this example, optionally the support structure 4 may comprise other layers which may be attached to or laminated with the support plate 5.

The support structure 4 further comprises a rim portion 10 fixed to the front side of the support plate 5 and extending around the support plate 5. The rim portion 10 has a central aperture 11.

The support structure 4 further comprises an IC (integrated circuit) chip 30 and a gyroscope sensor 31 fixed on the rear side of the support plate 5. A control circuit described further below is implemented in the IC chip 30.

The moving plate 9, together with the image sensor 6, is suspended on the support structure 4 in a manner allowing movement of the image sensor 6 in any direction laterally to the light-sensitive region 7 of the image sensor 6 (i.e. laterally of the optical axis O and parallel to the plane in which the light-sensitive region 7 extends) and further allowing rotation of the image sensor about the optical axis O. In the illustrated example, the moving plate 9 is suspended on the support structure 4 by a suspension system in the form of a plain bearing 100 provided between the support plate 5 and the moving plate 9 as will now be described.

In this example, the plain bearing 100 comprises a first bearing surface 101 on the carrier 8, in particular being the lower surface of the moving plate 9, and a second bearing surface 102 on the support structure 4, in particular being the upper surface of the support plate 5. In this example, bearing surfaces 101 and 102 are each planar. The bearing surfaces 101 and 102 bear on each other and thereby suspend the carrier 8 on the support structure 4. Since the bearing surfaces 101 and 102 may slide relative to each other, they allow movement of the image sensor 6 in any direction laterally to the light-sensitive region 7 of the image sensor 6 and further allow rotation of the image sensor about the optical axis O.

The plain bearing 100 not only suspends the image sensor 6, but also facilitates heat transfer from the image sensor 6 to the support structure 4. This is because the bearing surface surfaces 101 and 102 provide a continuous region of thermally conductive material without an air gap. This provides a path having good thermal conductivity for dissipating heat from the image sensor 6, as well as providing the requisite suspension. This allows the support structure 4 to act as a heat sink for the image sensor 6.

Heat transfer from the image sensor 6 is further facilitated by forming the moving plate 9 and support plate 5 from materials having a high thermal conductivity, for example metal.

Figure 5:
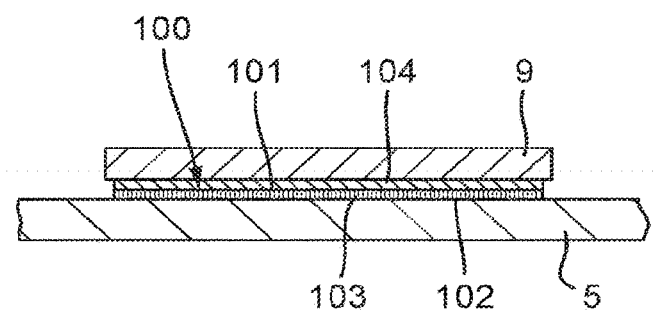
FIGS. 5 to 7 are cross-sectional views of alternative plain bearings that may be applied in the camera assembly.
Figure 6:
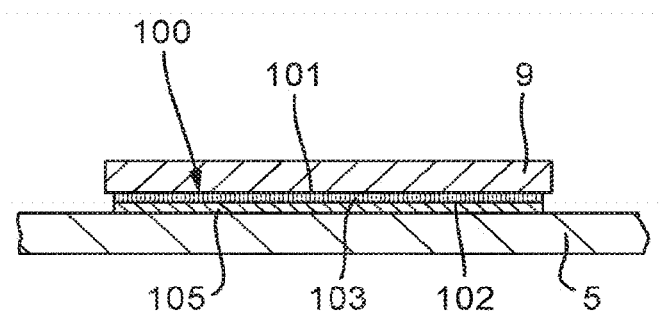
Figure 7:
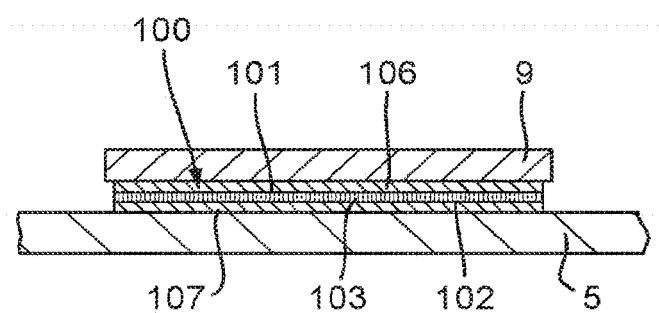

FIGS. 5 to 7 illustrate some alternative constructions for the plain bearing 100 in which bearing members providing at least one of the bearing surfaces 101 and 102 are employed, instead of the bearing surfaces 101 and 102 being surfaces of the moving plate 9 and the support plate 5.

In the alternative of FIG. 5, the bearing 100 includes a bearing member 104 fixed to the moving plate 9. Thus, the first bearing surface 101 is the lower surface of the bearing member 104 and the second bearing surface 102 is the upper surface of the support plate 5.

In the alternative of FIG. 6, the bearing 100 includes a bearing member 105 fixed to the support plate 5. Thus, the first bearing surface 101 is the lower surface of the moving plate 9 and the second bearing surface 102 is the upper surface of the bearing member 105.

In the alternative of FIG. 7, the bearing 100 includes a bearing member 106 fixed to the moving plate 9 and a bearing member 107 fixed to the support plate 5. Thus, the first bearing surface 101 is the lower surface of the bearing member 106 and the second bearing surface 102 is the upper surface of the bearing member 107.

Where one or more bearing member is used, they may be fixed to the moving plate 9 or the support plate 5 by adhesive.

Where one or more bearing member 104 to 107 is used, the or each bearing member 104 to 107 separates the moving plate 9 and the support plate 5, and the thickness of the or each bearing member 104 to 107 is chosen accordingly.

An advantage of using one or more bearing members 104 to 107 is that the material of the bearing member may be chosen to improve the bearing performance, for example having a reduced wear and/or reduced coefficient of friction.

Figure 8:
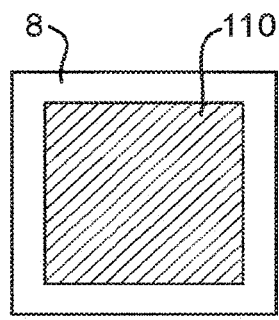
FIGS. 8 to 11 are plan views of the area of the contact of the plain bearing(s) of the camera assembly.

In the illustrated example, a single plain bearing 100 is provided between the support plate 4 and the carrier 8. In this example, the plain bearing 100 has a rectangular area of contact 110 between the bearing surfaces 101 and 102 as shown in FIG. 8 together with the carrier 8. However, in general, the area of contact may be varied and/or plural plain bearings 100 may be provided.

Figure 9:
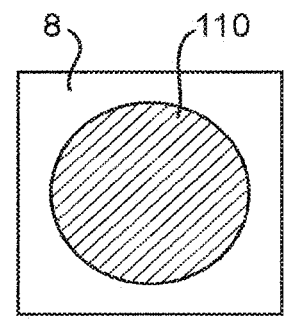
Figure 10:
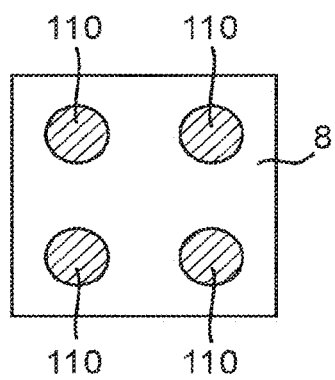
Figure 11:
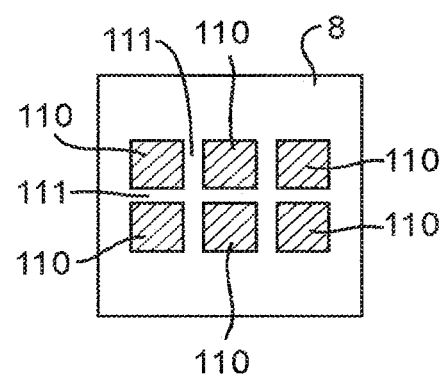

FIGS. 9 to 11 illustrate the areas of contact 110 in some alternative, non-limitative alternative arrangements for the plain bearing 100.

In the case of providing a single plain bearing 100, the area of contact 110 of the plain bearing 100 may have shapes other than rectangular. By way of example the area of contact 110 may have a circular shape as shown in FIG. 9, which may be easier to manufacture and/or assist in providing a balanced bearing contact.

The alternative of providing plural plain bearings 100 may assist in manufacture and/or assist in providing a balanced bearing contact. Typically at least three plain bearings may be used to provide a stable contact. FIG. 10 illustrates an example comprising four plain bearings 100 with circular areas of contact 110 located in the corners of the carrier 8.

Advantageously, plural plain bearings 100 each formed by one or more bearing members 104 to 107 (as in any of the examples of FIGS. 5 to 7 described above) may be provided with channels between the bearing members 104 to 107. Such channels may collect wear particles. FIG. 11 illustrates an example of this type comprising six plain bearings 100 with rectangular areas of contact 110 in a regular rectangular array with channels 111 provided therebetween.

The total area of contact of the bearing surfaces 101 and 102 of the plain bearing 100 (being the total area of all the plain bearings 100 if more than one is provided) is chosen to control the friction and the thermal conductivity. In general, there is a balance between reducing friction by minimising the total area and increasing thermal conductivity by maximising the total area.

Surprisingly, the use of one or more plain bearings 100 can in fact provide good performance as a bearing with friction that is sufficiently low to allow movement perpendicular to the optical axis O, having regard to the force applied by the SMA actuator wires 40. As the plain bearing 100 maintain a relatively high total area of contact over the bearing surfaces 101 and 102, the impact of wear occurring over time is reduced, compared to a bearing having a point or line contact.

With regard to thermal conductivity, the total area of contact of the bearing surfaces 101 and 102 of the plain bearing 100 is chosen to be sufficiently large with respect to the size of the image sensor 6 so that the thermal conductivity removes the heat generated thereby. Typically, the total area of contact may be at least 0.2 times, preferably at least 0.5 times, the area of the light-sensitive region 7 of the image sensor 6. The total area of contact may even be larger than the light-sensitive region 7 of the image sensor 6 or larger than the overall dimensions of the image sensor 6. To achieve this, the carrier 8 may be arranged to have larger overall dimensions than the image sensor 6.

The material properties of the bearing surfaces 101 and 102 are chosen to provide a low friction and low wear plain bearing.

With regard to reducing friction, the bearing surfaces 101 and 102 may be designed to have a coefficient of friction of 0.2 or less.

The bearing surfaces 101 and 102 may each be made from the same material as the element on which it is formed, for example the support plate 5, moving plate 9 or bearing member 104 to 107. That material may be selected to provide suitable properties.

Where a bearing member 104 to 107 is provided its material may be selected to provide suitable properties. By way of non-limitative example, the bearing member 104 to 107, where used, may be made from a polymer, for example nylon, polytetrafluoroethylene (PTFE) (e.g. Teflon), an acetal (e.g. Delrin) or an Ultra High Molecular Weight Polyethylene (UHMWPE).

Alternatively, the bearing surfaces 101 and 102 may be coated with material selected to provide suitable properties. Where a coatings is used, the coating may have lower friction and/or lower wear than the material of the element which is coated, for example the support plate 5, moving plate 9 or bearing member 104 to 107. By way of non-limitative example, the coating, where used, may be made from a polymer, for example nylon, polytetrafluoroethylene (PTFE) (e.g. Teflon), an acetal (e.g. Delrin) or an Ultra High Molecular Weight Polyethylene (UHMWPE).

A fluid 103 may be disposed between the bearing surfaces 101 and 102, as shown in the illustrated examples. The material properties of the fluid 103 if provided are selected to provide lubrication between the bearing surfaces 101 and 102 so that the coefficient of friction between the bearing surfaces 101 and 102 is reduced and/or to have a thermal conductivity that improve the thermal contact between the bearing surfaces 102 and 103. For example, the fluid 103 may be a grease.

However, the fluid 103 is optional. As an alternative to providing the fluid 103, the bearing surfaces 101 and 102 may be in direct contact. Depending on the material properties of the bearing surfaces 101 and 102 and/or coatings thereon, this may provide a coefficient of friction and a thermal contact that is sufficient.

In addition, the camera assembly 2 comprises two flexures 67 connected between the support structure 4 and the carrier 8 to act as a biasing arrangement that biases the bearing surfaces 101 and 102 together, as well as providing an electrical connection to the image sensor 6. In this example, the flexures 67 are formed integrally with the moving plate 9 at one end 68 thereof and are mounted to the support plate 5 of the support structure 4 at the other end 69 thereof. Alternatively, the flexures 67 could be formed integrally with a plate of the support structure 4 and mounted to the carrier, or else could be separate elements mounted to each of the support structure 4 and the carrier 8. In any of these examples, the mounting of the flexures 67 may be achieved by soldering which provides both mechanical and electrical connection.

The flexures 67 are arranged as follows to provide their mechanical function. Each flexure 67 is an elongate beam connected between the support structure 4 and carrier 8. The flexures 67, due to their intrinsic resilience, bias the support structure 4 and the carrier 8 together, the biasing force being applied parallel to the optical axis O. This maintains the contact between the bearing surfaces 101 and 102 of the plain bearing 100. At the same time, the flexures 67 may be laterally deflected to permit lateral movement and rotation of the image sensor 6 relative to the support structure 4 to permit the OIS function.

The flexures 67, again due to their intrinsic resilience, also provide a lateral biasing force that biases the image sensor 6 towards a central position aligned with the optical axis O of the lens assembly 20 from any direction around that central position. As a result, in the absence of driving of the SMA actuator wires 40, the image sensor 6 will tend towards the central position. This ensures that the camera apparatus 1 remains functional to capture images, even in the absence of driving of the SMA actuator wires 40.

The flexures 67 are designed as follows to provide a suitable retaining force along the optical axis O for the plain bearing 100, and also to permit lateral movement with a lateral biasing force. The magnitude of the lateral biasing force is kept low enough as not to hinder OIS, whilst being high enough to centre the image sensor 6 in the absence of driving. Each flexure 67 has a cross-section with an average width orthogonal to the optical axis O is that is greater than its average thickness parallel to the optical axis O. Each flexure 67 extends in an L-shape around the optical axis O, it in general being desirable that the angular extent is at least 90° as measured between the ends of the flexure 67.

In the assembled state of the camera assembly 2, the flexures 67 are deflected from their relaxed state to provide a pre-loading force that biases the support structure 4 and the carrier 8 together.

The flexures 67 are made of a suitable material that provides the desired mechanical properties and is electrically conductive. Typically, the material is a metal having a relatively high yield, for example steel such as stainless steel.

In addition, the flexures 67 support electrical tracks connected to at least the image sensor 6. In this manner, the flexures 67 provide an electrical function, as well as a mechanical function. This avoids the need for a separate electrical connection to be made to the image sensor 6, which could otherwise hinder the movement of the image sensor 6 during OIS.

Although in this example the moving plate 9 is suspended on the support structure 4 by a suspension system in the form of the plain bearing 100, in accordance with the first aspect of the present invention any other type of suspension system may be provided. For example, a suspension system employing plural beams extending parallel to the optical axis O, for example as disclosed in WO-2013/175197 for suspending a lens assembly, or a suspension system employing ball bearings, for example as disclosed in WO-2014/083318 for suspending a lens assembly.

Movement of the image sensor 6 relative to the support structure 4 is driven by an actuator arrangement that is arranged as follows, and seen most easily in FIG. 4. The actuator arrangement is formed by a total of four SMA actuator wires 40 connected between the support structure 4 and the carrier 8. For attaching the SMA actuator wires 40, the carrier 8 comprises crimp portions 41 fixed to the moving plate 9 and the support structure 4 comprises crimp portions 42 fixed to the rim portion 10. The crimp portions 41 and 42 crimp the four SMA actuator wires 40 so as to connect them to the support structure 4 and the carrier 8. The crimp portions 41 fixed to the moving plate 9 are formed integrally from a sheet of metal so as to electrically connect the SMA actuator wires 40 together at the carrier 8.

Although in this example the crimp portions 41 and 42 are separate elements fixed to the moving plate 9 and the rim portion 10, as an alternative the crimp portions 41 could be formed integrally with the moving plate 9 and/or the crimp portions 42 could be formed integrally with the support plate 5.

The SMA actuator wires 40 are arranged as follows so that they are capable, on selective driving, of moving the image sensor 6 relative to the support structure 4 in any direction laterally to the light-sensitive region 7 of the image sensor 6 and also of rotating the image sensor 6 about the optical axis O.

Each of the SMA actuator wires 40 is held in tension, thereby applying a force between the support structure 4 and the carrier 8.

The SMA actuator wires 40 may be perpendicular to the optical axis O so that the force applied to the carrier 8 is lateral to the light-sensitive region 7 of the image sensor 6. Alternatively, the SMA actuator wires 40 may be inclined at a small angle to the light-sensitive region 7 of the image sensor 6 so that the force applied to the carrier 8 includes a component lateral to the light-sensitive region 7 of the image sensor 6 and a component along the optical axis O that acts as a biasing force that biases the bearing surfaces 101 and 102 of the plain bearing 100 together.

The overall arrangement of the SMA actuator wires 40 will now be described, being similar to that described in WO-2014/083318, except that they are connected to the carrier 8 for moving the image sensor 6, not to the lens assembly 20.

SMA material has the property that on heating it undergoes a solid-state phase change which causes the SMA material to contract. At low temperatures the SMA material enters the Martensite phase. At high temperatures the SMA enters the Austenite phase which induces a deformation causing the SMA material to contract. The phase change occurs over a range of temperature due to the statistical spread of transition temperature in the SMA crystal structure. Thus heating of the SMA actuator wires 40 causes them to decrease in length.

The SMA actuator wires 40 may be made of any suitable SMA material, for example Nitinol or another Titanium-alloy SMA material. Advantageously, the material composition and pre-treatment of the SMA actuator wires 40 is chosen to provide phase change over a range of temperature that is above the expected ambient temperature during normal operation and as wide as possible to maximise the degree of positional control.

On heating of one of the SMA actuator wires 40, the stress therein increases and it contracts, causing movement of the image sensor 6. A range of movement occurs as the temperature of the SMA increases over the range of temperature in which there occurs the transition of the SMA material from the Martensite phase to the Austenite phase. Conversely, on cooling of one of the SMA actuator wires 40 so that the stress therein decreases, it expands under the force from opposing ones of the SMA actuator wires 40. This causes the image sensor 6 to move in the opposite direction.

The carrier 8 and the image sensor 6 are positioned axially within the aperture 11 of the rim portion 10 of the support structure 4. The four SMA actuator wires 40 are arranged on four sides of the image sensor 6. The SMA actuator wires 40 are of the same length and have a rotationally symmetrical arrangement.

As viewed axially, a first pair of the SMA actuator wires 40 extend parallel to a first axis (vertical in FIG. 4) that is lateral to the light-sensitive region 7 of the image sensor 6. However, the first pair of the SMA actuator wires 40 are oppositely connected to the support structure 4 and the carrier 8 so that they apply forces in opposite directions along the first axis (vertically up and down in FIG. 4). The forces applied by the SMA actuator wires 40 of the first pair balance in the event that the tension in each SMA actuator wire 40 is equal. This means that the first pair of the SMA actuator wires 40 apply a first torque to the image sensor 6 (anti-clockwise in FIG. 4).

As viewed axially, a second pair of SMA actuator wires 40 extend parallel to a second axis (horizontal in FIG. 4) that is lateral to the light-sensitive region 7 of the image sensor 6. However, the second pair of SMA actuator wires 40 are oppositely connected to the support structure 4 and the carrier 8 so that they apply forces in opposite directions along the second axis (horizontally left and right in FIG. 4). The forces applied by the SMA actuator wires 40 of the second pair balance in the event that the tension in each SMA actuator wire 40 is equal. This means that the second pair of the SMA actuator wires 40 apply a second torque (clockwise in FIG. 3) to the image sensor 6 that is arranged to be in an opposite sense to the first torque. Thus, the first and second torques balance in the event that tension in each SMA actuator wire 40 is the same.

As a result, the SMA actuator wires 40 may be selectively driven to move the image sensor 6 in any direction laterally and to rotate the image sensor 6 about the optical axis O. That is:

movement of the image sensor 6 in either direction along the first axis may be achieved by driving the first pair of SMA actuator wires 40 to contract differentially, due to them applying forces in opposite directions;

movement of the image sensor 6 in either direction along the second axis may be achieved by driving the second pair of SMA actuator wires 40 to contract differentially, due to them applying forces in opposite directions; and rotation of the image sensor 6 may be achieved by driving the first pair of SMA actuator wires 40 and the second pair of SMA actuator wires 40 to contract differentially, due to the first and second torques being in opposite senses.

The magnitude of the range of movement and rotation depends on the geometry and the range of contraction of the SMA actuator wires 40 within their normal operating parameters.

This particular arrangement of the SMA actuator wires 40 is advantageous because it can drive the desired lateral movement and rotation with a minimum number of SMA actuator wires. However, other arrangements of SMA actuator wires 40 could be applied. To provide three degrees of motion (two degrees of lateral motion and one degree of rotational motion), then a minimum of four SMA actuator wires 40 are provided. Other arrangements could apply a different number of SMA actuator wires 40. Less SMA actuator wires 40 could be provided for lateral motion, but not rotation. Arrangements with more than four SMA actuator wires 40 are also possible, and may have advantages in allowing additional parameters to be controlled in addition to motion, for example the degree of stress in the SMA actuator wires 40.

The lateral position and orientation of the image sensor 6 relative to the support structure 4 is controlled by selectively varying the temperature of the SMA actuator wires 40. This driving of the SMA actuator wires 40 is achieved by passing selective drive signals through the SMA actuator wires 40 to provide resistive heating. Heating is provided directly by the current of the drive signals. Cooling is provided by reducing or ceasing the current of the drive signals to allow the SMA wire 40 to cool by conduction, convection and radiation to its surroundings.

The camera apparatus 1 comprises a lens assembly 20 that is assembled with the camera assembly 2 by being mounted to the support structure 4, in particular to the rim portion 10.

The lens assembly 20 comprises a lens carriage 21 in the form of a cylindrical body that is mounted to the rim portion 10 of the support structure 4. The lens carriage supports at least one lens 22 arranged along the optical axis O. In general any number of one or more lenses 22 may be provided. Without limitation to the invention, in this example the camera apparatus 1 is a miniature camera in which the at least one lens 22 (i.e. each lens 22 if plural lenses are provided) typically have a diameter of at most 10 mm. The at least one lens 22 of the lens assembly 20 is arranged to focus an image onto the image sensor 6.

In this example, at least one lens 22 is supported on the lens carriage 21 in a manner in which at least one lens 22 is movable along the optical axis O relative to the lens carriage 21, for example to provide focusing or zoom, although that is not essential. In particular, the at least one lens 22 is fixed to a lens holder 23 which is movable along the optical axis O relative to the lens carriage 21. Where there are plural lenses 22, any or all of the lenses 22 may be fixed to the lens holder 23 and/or one or more of the lenses 22 may be fixed to the lens carriage 21 and so not movable along the optical axis O relative to the lens carriage 21.

An axial actuator arrangement 24 provided between the lens carriage 21 and the lens holder 23 is arranged to drive movement of the lens holder 21 and lenses 22 along the optical axis O relative to the lens carriage 21. The axial actuator arrangement 24 may be any suitable type, for example being a voice coil motor (VCM) or an arrangement of SMA actuator wires, such as is described in WO-2007/113478 which is incorporated herein by reference.

In addition, the camera apparatus 1 comprises a can 15 fixed to the support structure 4 and protruding forwardly therefrom to encase and protect the other components of the camera apparatus 1.

As discussed above, in operation the SMA actuator wires 40 are selectively driven to move the image sensor 6 in any direction laterally and to rotate the image sensor 6 about the optical axis O. This is used to provide OIS, compensating for image movement of the camera apparatus 1, caused by for example hand shake.

Relative movement of the image sensor 6 relative to the support structure 4 and hence also relative to the lens assembly 20 may be used to stabilise the image against tilting of the camera apparatus 1, i.e. rotation about axes extending laterally to the light-sensitive region 7 of the image sensor 6. This occurs in a similar manner to a camera apparatus providing OIS-lens shift of the type disclosed in WO-2013/175197 and WO-2014/083318 which also involves relative lateral movement of the image sensor 6 and lens assembly 20. In addition, rotation of the images sensor 6 may be used to stabilise the image against rotation of the camera apparatus 1 around the optical axis O. This type of stabilisation is not achieved by a camera apparatus providing OIS-lens shift of the type disclosed in WO-2013/175197 and WO-2014/083318.

The SMA actuator wires 40 are driven by the control circuit implemented in the IC chip 30. In particular, the control circuit generates drive signals for each of the SMA actuator wires 40 and supplies the drive signals to the SMA actuator wires 40.

The control circuit 30 receives the output signals of the gyroscope sensor 31 which acts as a vibration sensor. The gyroscope sensor 31 detects the vibrations that the camera apparatus 1 is experiencing and its output signals represent those vibrations, specifically as the angular velocity of the camera lens element 20 in three dimensions. The gyroscope sensor 31 is typically a pair of miniature gyroscopes, for detecting vibration around three axes, being two axes laterally of the light-sensitive region 7 of the image sensor 6 and also the optical axis O. More generally, larger numbers of gyroscopes or other types of vibration sensor could be used.

The drive signals are generated by the control circuit in response to the output signals of the gyroscope sensor 31 so as to drive movement of the camera lens element 20 to stabilise an image focused by the camera lens element 20 on the image sensor 6, thereby providing OIS. The drive signals may be generated using a resistance feedback control technique for example as disclosed in any of International Patent Application No. PCT/GB2013/051325; International Patent Application No. PCT/GB2013/052959; WO-2012/066285; WO-2012/020212; WO-2011/104518; WO-2012/038703; WO-2010/089529 or WO-2010029316, each of which is incorporated herein by reference.

The invention claimed is:

1. A camera assembly comprising:
   a support structure;
   an image sensor having a light-sensitive region, the image sensor being suspended on the support structure in a manner allowing (i) movement of the image sensor relative to the support structure in any direction laterally to the light-sensitive region of the image sensor and (ii) rotation of the image sensor about an axis orthogonal to the light-sensitive region; and
   a plurality of shape memory alloy actuator wires in an arrangement capable, on selective driving thereof, of (i) moving the image sensor relative to the support structure in any direction laterally to the light-sensitive region of the image sensor and (ii) rotating the image sensor about the axis orthogonal to the light-sensitive region.

2. The camera assembly according to claim 1, wherein the plurality of shape memory alloy actuator wires comprise a total of four shape memory alloy actuator wires.

3. The camera assembly according to claim 2, wherein the four shape memory alloy actuator wires are arranged on four sides of the image sensor.

4. The camera assembly according to claim 2, wherein the four shape memory alloy actuator wires comprise a first pair of shape memory alloy actuator wires arranged to apply forces to the image sensor in opposite directions along a first axis lateral to the light-sensitive region of the image sensor and to apply a first torque to the image sensor, and a second pair of shape memory alloy actuator wires arranged to apply forces to the image sensor in opposite directions along a second axis lateral to the light-sensitive region of the image sensor and perpendicular to the first axis, and to apply a second torque to the image sensor in an opposite sense to the first torque.

5. The camera assembly according to claim 1, wherein the image sensor is mounted on a carrier, and the plurality of shape memory alloy actuator wires are connected between the support structure and the carrier.

6. The camera assembly according to claim 1, further comprising:
- a lens assembly comprising at least one lens arranged to focus an image on the light-sensitive region of the image sensor, the lens assembly being mounted to the support structures;
- a movable element coupled to the image sensor; and
- at least one plain bearing that bears the movable element on the support structure, allowing movement of the movable element relative to the support structure orthogonal to an optical axis of the lens assembly.

7. The camera assembly according to claim 1, further comprising:
- a control circuit arranged to drive each of the plurality of shape memory alloy actuator wires; and/or
- a vibration sensor arranged to generate output signals representative of vibration of the camera assembly, the control circuit being arranged to drive each of the plurality of shape memory alloy actuator wires in response to the output signals of the vibration sensor for driving movement of the image sensor to stabilise an image captured thereby.

8. The camera assembly according to claim 1, wherein the light-sensitive region of the image sensor has a diagonal length of at most 12 mm.

9. The camera assembly according to claim 1, wherein the lateral movement is translational movement.

10. The camera assembly according to claim 1, further comprising a lens assembly comprising at least one lens arranged to focus an image on the light-sensitive region of the image sensor, the lens assembly being mounted to the support structure.

* * * * *